(12) United States Patent
Chamberlin et al.

(10) Patent No.: US 12,375,767 B2
(45) Date of Patent: Jul. 29, 2025

(54) AGGREGATED MEDIA CONTENT SELECTION AND BROADCASTING

(71) Applicant: MyFlickList, Inc., San Francisco, CA (US)

(72) Inventors: Eli Bruce Paul Chamberlin, Pinedale, WY (US); Douwe Joannes Bos, Soest (NL); David Sanderson, San Francisco, CA (US)

(73) Assignee: MyFlickList, Inc., San Francisco, CA (US)

( * ) Notice: Subject to any disclaimer, the term of this patent is extended or adjusted under 35 U.S.C. 154(b) by 0 days.

(21) Appl. No.: 17/321,365

(22) Filed: May 14, 2021

(65) Prior Publication Data

US 2022/0007080 A1  Jan. 6, 2022

Related U.S. Application Data

(60) Provisional application No. 63/048,631, filed on Jul. 6, 2020.

(51) Int. Cl.
*H04N 21/472* (2011.01)
*H04N 21/482* (2011.01)

(52) U.S. Cl.
CPC ..... *H04N 21/47217* (2013.01); *H04N 21/482* (2013.01)

(58) Field of Classification Search
CPC ......... H04N 21/41407; H04N 21/4622; H04N 21/47217; H04N 21/482
See application file for complete search history.

(56) References Cited

U.S. PATENT DOCUMENTS

| | | | | |
|---|---|---|---|---|
| 2010/0262911 | A1* | 10/2010 | Kaplan | H04N 5/772 715/719 |
| 2016/0092042 | A1* | 3/2016 | Yenigalla | H04N 21/84 715/716 |
| 2016/0156992 | A1* | 6/2016 | Kuper | H04L 65/612 725/78 |
| 2017/0026686 | A1* | 1/2017 | Glazier | H04N 21/4782 |
| 2017/0357389 | A1* | 12/2017 | Fleizach | G06F 3/0482 |
| 2018/0310044 | A1* | 10/2018 | Wittke | H04N 21/83 |
| 2019/0141398 | A1* | 5/2019 | Auxer | H04N 21/472 |
| 2019/0320234 | A1* | 10/2019 | Chong | G06Q 10/0631 |
| 2020/0201495 | A1* | 6/2020 | Coffman | G06F 3/167 |
| 2020/0233573 | A1* | 7/2020 | De Camargo Barscevicius | G06F 3/165 |

* cited by examiner

*Primary Examiner* — Rong Le

(74) *Attorney, Agent, or Firm* — Cognition IP, P.C.; Edward Steakley

(57) ABSTRACT

Methods and systems describe providing for aggregated media content selection and broadcasting. The system receives service providers associated with a user, and also receives media content and associated content metadata. The system then configures a user interface on a client device for navigation and selection of media content. The system determines available broadcasting devices, and receives a media content selection and broadcasting device selection. The system then initiates playback of the media content on the selected broadcasting device.

26 Claims, 11 Drawing Sheets

FIG. 3B

AGGREGATED MEDIA CONTENT SELECTION AND BROADCASTING

CROSS-REFERENCE TO RELATED APPLICATIONS

This application claims the benefit of U.S. Provisional Application No. 63/048,631, filed Jul. 6, 2020, which is hereby incorporated by reference in its entirety.

FIELD OF THE INVENTION

The present invention relates generally to media content, and more particularly, to systems and methods for aggregated media content selection and broadcasting.

BACKGROUND

Within the media landscape, streaming of media content has become a popular way for media providers and/or distributors to deliver media content to users. Streaming services have transformed the industry and altered the habits of media consumers on a fundamental level. Streaming services providers such as Netflix, Amazon, Hulu, HBO, Disney, and more offer streaming services for audiovisual content in ways that are compelling and convenient for the uses of those services.

While the proliferation of streaming services on the media landscape is an indication of how important they are for consumers and the industry, users of the services frequently complain that there are too many services, all of which are offering a significant amount of exclusive content which cannot be found on other services. Thus, switching between multiple services a user is subscribed to is cumbersome, time-consuming, and decreases the level of convenience which streaming services cite as a major benefit. In addition, different streaming services are compatible with different broadcasting devices. For example, one broadcasting device may have a streaming application for Service A installed or installable on the device, but not a streaming application for Service B. A user subscribed to both Service A and Service B will have to switch to a different broadcasting device to play back any media content from Service B.

In addition, it is often difficult for users to quickly get a sense of which media content is available across multiple services, where this content would be available, and how to watch it on their primary screen. Television shows and movies are available on multiple rent or purchase services (e.g., iTunes, Amazon, or similar), subscription services (e.g., Hulu, Netflix, or similar), and free-with-advertising services (e.g., Tubi, Crackle, or similar), and users frequently do not know where to find content, or cannot browse through all the content they have access to in one place.

Moreover, once users have found media content they wish to view, often through using their mobile device (e.g., a smartphone or tablet), they often cannot get that content to a broadcasting device they want to watch the content on without having to search again through that broadcasting device. This switch between both devices and user interfaces causes friction between the consumer and the media content provider, making it difficult for the user to access media content they wish to consume.

Thus, there is a need in the field of media content to create new and useful systems and methods providing for aggregation of streaming media content from multiple disparate streaming service providers into one unified application for navigation and facilitation of playback on broadcasting devices. The source of the problem, as discovered by the inventors, is a lack of a unified streaming service aggregator within an application which allows a user to easily navigate and play back content across multiple services and broadcasting devices.

SUMMARY

The invention overcomes the existing problems by providing for a streaming service aggregator which is configured to aggregate media content from multiple streaming services a user is subscribed to, allow the user to navigate through and select that media content within one user interface, select a compatible broadcasting device for that content, and play back that content on the broadcasting device. In some embodiments, a user is provided with a searchable, navigable (or "browsable") guide of television ("TV") shows and movies across all of the various over-the-top ("OTT") online services the user can access. In some embodiments, a user selects which services he or she would like to browse or search, and a "guide" user interface is configured for that user within an application on their device of choice (e.g., a mobile device such as a smartphone).

Within a few taps or other interactive actions, the user can launch the show or movie they wish to see from their mobile device, for playback on their own smart TV or TV connected to a smart TV box (e.g., Roku, WebOS, FireTV, Android TV, or similar). In some embodiments, once the content has been launched, the application with user interface allows the user to control the TV inputs and/or launch additional content of their choosing, within the application of their choosing, and on the broadcasting device of their choosing. In some other embodiments, the user may be limited to launching the media, with no ability to control inputs or launch additional content. The systems and methods generally assist users in finding what they wish to watch and where to watch it, and then facilitates the broadcast of the content on that device of their choice.

In some embodiments, these aspects of the invention are performed in real-time or substantially real-time, such that navigation, selection, and playback of content happens with insignificant or minimal processing time. In some embodiments, one or more of these aspects are performed concurrently to each other to decrease or eliminate processing times between steps. In some embodiments, an interactive "virtual remote" can appear within the user interface, which a user can use like a traditional TV remote to, e.g., control playback, navigate to other media content, and more.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3B is an additional diagram illustrating two example embodiments of a user navigating an aggregated streaming media application, in accordance with some embodiments.

DETAILED DESCRIPTION

Figure 1A:
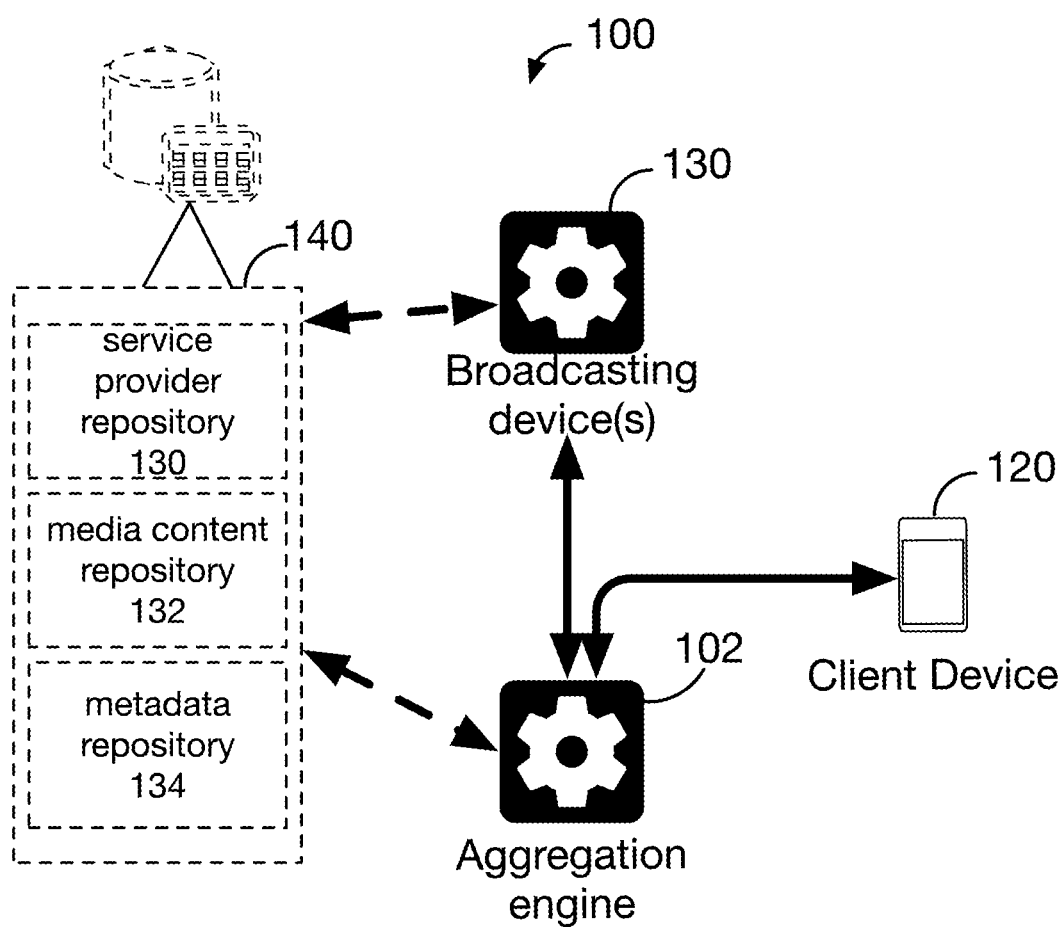
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a client device 120 is connected to an aggregation engine 102. The aggregation engine 102 is connected to one or more broadcasting device(s) 130, and both the aggregation engine 102 and the broadcasting device(s) 130 can optionally be connected to one or more database(s) 140, including, for example, a service provider repository 130, media content repository 132, and/or metadata repository 134. One or more of the databases may be combined or split into multiple databases. One or more of the aggregation engine, broadcasting device(s), and/or client device in this environment may be computers. In some embodiments, the aggregation engine is hosted on an application installed on the client device 120.

The exemplary environment 100 is illustrated with only one client device, one aggregation engine, and one broadcasting device, for simplicity, though in practice there may be more or fewer client devices, aggregation engines, and/or broadcasting devices. In some embodiments, the client device and/or aggregation engine may be part of the same computer or device.

In an embodiment, the aggregation engine 102 may perform the method 200 (FIG. 2A) or other method herein and, as a result, provide aggregated media content selection and broadcasting. In some embodiments, this may be accomplished via communication with the client device, broadcasting device(s), and/or other device(s) over a network, application server, and/or some other network server. In some embodiments, the aggregation engine 102 is an application hosted on a computer or similar device, or is itself a computer or similar device configured to host an application to perform some of the methods and embodiments herein.

Client device 120 is a device that is configured to display information in a user interface and allow for a user to interact with elements of the user interface. In some embodiments, the client device 120 provides the user interface in the form of an application installed on the device, a web application or service, or any other suitable form. In some embodiments, client device 120 is a computing device capable of hosting and executing one or more applications or other programs capable of sending and/or receiving information. In some embodiments, the client device 120 may be a computer desktop or laptop, mobile phone, tablet, virtual assistant, virtual reality or augmented reality device, wearable, or any other suitable device capable of sending and receiving information. In some embodiments, the aggregation engine 102 may be hosted in whole or in part as an application executed on the client device 120.

Broadcasting device 130 is a device that is configured to play back media content. In some embodiments, the broadcasting device is a "smart device" (e.g., a smart TV or a smart box) which is communicatively connected to one or more servers or networks and which hosts one or more applications for playing back media content. In some embodiments, the broadcasting device 130 can download and/or install applications which facilitate the playback of media content. In some embodiments, the broadcasting device can be made identifiable or visible on a network in which it is connected, allowing other devices (such as client device 120) to locate, identify, and send or receive data from the broadcasting device 130. For example, a client device may automatically identify broadcasting devices which are also connected to the same home network which the client device is connected to.

Additionally or alternatively, broadcasting device 130 may include one or more modules configured to "ping" (i.e., send a signal to make the broadcasting device's presence known to) one or more system server(s). This has the effect of notifying the system (via, e.g., an application programming interface or API) that the broadcasting device is "online", i.e., connected to the system servers. A list of connected broadcasting devices can then be sent to the client device, and upon selection of a broadcasting device from the list, the client device will send a signal back to the system servers, which subsequently forward the data to the broadcasting device. This will be described in further detail below.

Optional database(s) 140 may include one or more of a service provider repository 130, a media content repository 132, and/or a metadata repository 134. The optional database(s) function to store and/or maintain, respectively, information such as media content, service providers available, or metadata related to the media content. The optional database(s) may also store and/or maintain any other suitable information for the aggregation engine 102 to perform elements of the methods and systems herein. In some embodiments, the optional database(s) can be queried by one or more components of system 100 (e.g., by the aggregation engine 102), and specific stored data in the database(s) can be retrieved.

Figure 1B:
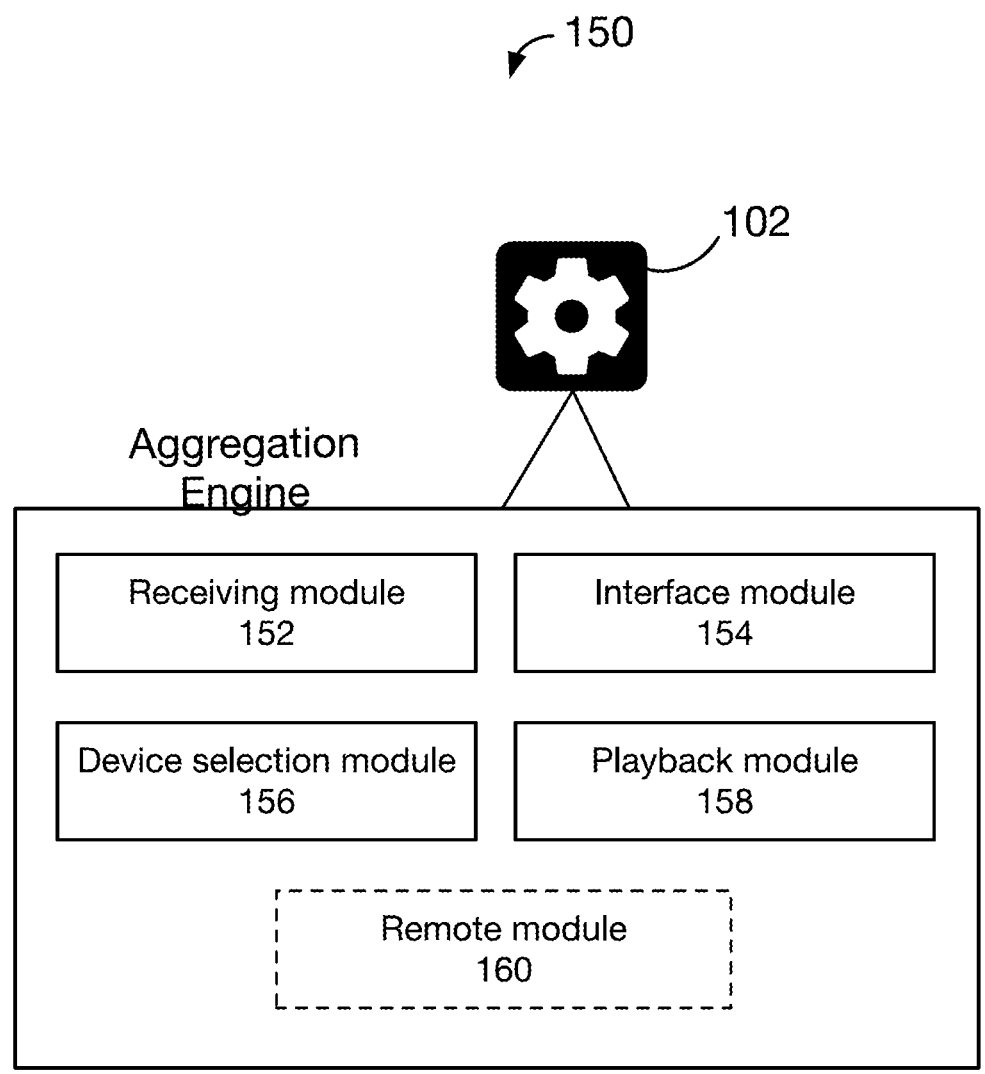
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module 152 functions to receive information from one or more sources, such as a client device 120 which sends the information to the aggregation engine 102. Input information can include, e.g., selection of service providers, selection of media content, virtual remote interactions, and more.

Interface module 154 functions to provide a user interface on the client device for the user to navigate through media content, select devices for broadcasting, broadcast content on desired devices, control playback, and more.

Device selection module 156 functions to provide for the connection to, and selection of, one or more broadcasting devices for playback of content.

Playback module 158 functions to play back media content on one or more broadcasting devices the user selects.

Optional remote module 160 functions to present a virtual remote for a user to interact with as though interacting with a traditional TV remote.

The above modules and their functions will be described in further detail in relation to an exemplary method below.

II. Exemplary Method

Figure 2A:
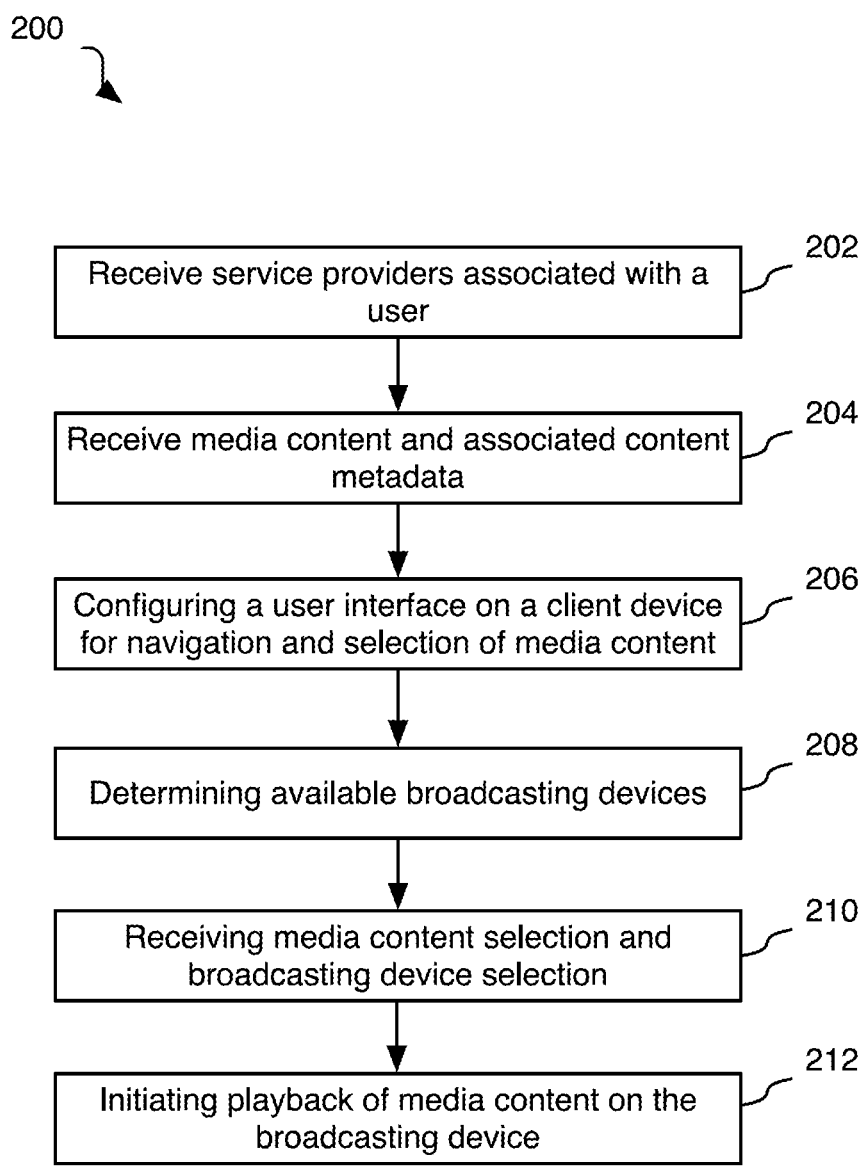
FIG. 2A is a flow chart illustrating an exemplary method that may be performed in some embodiments.

FIG. 2A is a flow chart illustrating an exemplary method that may be performed in some embodiments.

At step 202, the system receives service providers associated with a user. Service providers may be any providers or distributors of media content, and/or providers or distributors of media content services, including streaming services which stream media content to users via user devices such as TVs, mobile devices, computers, or other devices. Examples of service providers may include, e.g., Netflix, Amazon, Hulu, or any other provider of a streaming service. In some embodiments, a user of a service provider is linked to the service provider via a user account, subscription, or other form of connection marking the user as a user of that service. In some embodiments, one user may be associated with multiple service providers. In some embodiments, a service provider may allow one or more other services to integrate or connect with the service through an application programming interface (API) or other form of integration between applications or services.

In some embodiments, the system receives service providers automatically by determining which services the user is connected to, such as through a specified email account or other form of connection. In some embodiments, the system prompts the user to select one or more services from a predefined selection of services, asks the user to type the names of services, or otherwise prompts for a selection. The system then receives a selection from the user accordingly. In some embodiments, the user may search or browse some or all available content without needing to select any services the user may be connected to.

At step 204, the system retrieves media content and associated content metadata. Media content may be any playable media, such as, e.g., video such as movies, TV shows, or games, music or audio, virtual reality (VR) or augmented reality (AR) content, and more. In some embodiments, the system continuously, periodically, or semi-periodically retrieves all available content for each service which the system is set to monitor. In some embodiments, this retrieval may be performed concurrently during one or more other steps of the methods described herein. For example, the system may continuously crawl all available content on each service it monitors to retrieve content data. In various embodiments, this may include every service within the system, only services selected by the user in step 204, or some other subset of services. In some embodiments, the system stores and maintains the content within a media content database.

The system additionally receives content metadata associated with the content. In various embodiments, the content metadata can be received from, e.g., one or more service providers, production studios, and/or third parties. For example, in some cases, media content may be retrieved which is not yet currently available or offered on any of the services. In some embodiments, content metadata is stored and maintained within a metadata repository or database. In some embodiments, the content metadata includes information on which service is associated with that given piece of content. The information about which service offers the media content can be a metadata field. Other metadata fields can include, e.g., the title of the content, genre(s), description of the content, length or running time of the content, a popularity ranking or aggregated review score, similar media content, and more. When a user selects a certain combination of services or service providers, the media content and content metadata available on these services are retrieved from one or more databases. In some embodiments, the databases are local to the system's servers or are otherwise maintained server-side, such that the system need not remotely call or make requests to any service provider servers as a result of the user selecting service providers. In other embodiments, the system may call or request content from one or more service providers after the user selects service providers.

In some embodiments, the associated content metadata includes unique content identification data, which is used for identification and playback of the media content from one or more media servers or repositories for the media content. In some embodiments, the unique content identification data may be, e.g., a deeply linked address for the respective media content. For example, a unique address of a storage and/or playback location of a piece of media content may be needed or requested by a broadcasting device. In some embodiments, this address may be, e.g., a hyperlink or other form of linking to a searchable or indexed piece of content within a media content repository, media server, cloud server, or other location. In other embodiments, rather than a hyperlink or internet address, a unique identification number is provided for locating the media content on a media server of the service provider in order to initiate playback of the media content on the broadcasting device.

At step 206, the system configures a user interface on a client device for navigation and selection of media content. In some embodiments, the system displays the user interface on an application which is hosted on the client device. For example, the user may install a media content aggregation application on the client device. That application loads and allows a user to select one or more service providers the user is connected with. In some embodiments, an authentication process may appear for one or more of those service providers. A user interface appears which allows the user to navigate through a subset of the media content available from the service provider.

In some embodiments, the subset of media content which is presented to the user may be a customized subset the service provider has selected for the user in one or more ways. For example, the service may have its own methods of personalizing or customizing content for the user from among a wide variety of available content, and the same subset of the media content can be provided for the user accordingly. In some embodiments, other ways to filter or provide certain media content can be implemented. Some example embodiments will be described in further detail with respect to FIG. 4A and FIG. 4B below.

At step 208, the system determines available broadcasting devices. This includes determining a list of one or more devices available for the broadcasting of media content (i.e., "broadcasting devices"). In some embodiments, the client device itself may be listed as a broadcasting device (i.e., the content may be broadcasted directly on the client device if the user selects it as the device for broadcasting). In some embodiments, this determination includes determining which, if any, broadcasting devices are identifiable on a network which the client device is connected to. For example, the client device may be connected to a home wireless network. If a smart TV is also connected to the same home wireless network, then it will be identifiable by the client device when the client device searches for available devices, and will be included on the list of available broadcasting devices. In some embodiments, the system checks whether a specific service is installed, and if not, the system can install the service on the device directly, if possible. An aggregated media content application may not need to be installed on the playback device in some such cases. The system can, in some instances, provide content from the service provider directly on the playback device without the need for an aggregated media content application.

In other embodiments, the system may require an aggregated media content application to be installed. In such instances, the system can check whether an aggregated media content application is currently installed on the broadcasting device. If not, the system verifies whether, for each of the broadcasting devices which are connected but do not have an installed application, the media content application can be installed on the broadcasting device. If the application can be installed, and the device allows for the installation to occur automatically after initiation by the client device, then the device automatically installs the necessary application and is then listed as an available device. In some embodiments, a manual install by the user may be necessary instead, which can be implemented. Once installed, the device will appear on future determinations and listings of available devices, assuming all other criteria is met.

In some embodiments, the determination of available broadcasting devices is performed periodically, e.g., at regular periodic intervals, while the user is navigating through the media content and making selections. Thus, there is a concurrent, regular or semi-regular searching for and determination of available broadcasting devices during navigation on the user interface. This alleviates bottlenecks once the user has selected media, and avoids waiting or processing times to the extent possible.

At step 210, the system receives media content selection and broadcasting device selection. As the user navigates through the available choices for media content across one or multiple service providers, the user can make a selection of a particular piece of media content which the user wishes to watch. In some embodiments, the user clicks on the piece of media content in the user interface, and a sub screen appears with more detailed information and user interface buttons for playing the content, playback settings, navigating to other content, etc. In some embodiments, the more detailed information can include one or more pieces of information parsed from the associated content metadata for the piece of media content in question.

Once a media content selection is received, the system sends the most recently determined list of broadcasting devices to the user within the user interface, with a prompt to select a broadcasting device. In some embodiments, more than one broadcasting device can be selected for playback of the media content simultaneously.

The system can then receive, via the client device, a selection of a broadcasting device from the list of broadcasting devices. In some embodiments, the user can make a selection and the application can transfer the selection to an aggregation engine. In some embodiments, the system then sends a request message to the selected broadcasting device. In some embodiments, the request message is an HTTP request message or similar remote request message which can be directly sent from one device to another device connected on the same network.

In other embodiments, the client device instead communicates with one or more system servers. In some embodiments, the system servers are configured to send a notification (e.g., a push notification or any other suitable form of notification) to the broadcasting device to begin playback of the selected content. In some embodiments, the broadcasting device can continuously communicate with system servers. In some embodiments, via continuous or periodic API calls (e.g., "pinging" the system servers), the system can capture an up-to-date record of the broadcasting device and store the record within a server database. This allows an application on a client device, such as, e.g., an aggregated media content application to request a list of available broadcasting devices which are currently not discoverable on the system's network while the client device is connected. Thus in some embodiments, by sending an API request to the system's own servers, and having the servers forward the data to the broadcasting device that is pinging the servers, the system can potentially communicate with every broadcasting device available which is currently online and connected to the servers (e.g., logged in to a particular account within the system on the application of the respective device). In such instances, sending a notification (such as push notification) to the broadcasting device can serve as a replacement for direct device-to-device communication.

In some embodiments, rather than, e.g., sending an HTTP request message or pinging the system servers as described above, the system can instead open a "Web Socket" with a broadcasting device to enable direct, bilateral (i.e., two-way), continuous communication to occur between the broadcasting device and the client device. In varying embodiments, the Web Socket can be used for, e.g., initiating the playback of the media content, enabling features of a virtual remote (as will be described in further detail below), any other suitable step or process described herein, or some combination thereof. Web Sockets are upgraded HTTP protocols wherein upon a connection being created, multiple messages are sent over the socket until it is closed.

In some embodiments, this can enable bi-directional streaming of data such as media content in real time or substantially real time, while removing the need for HTTP long polling and similar techniques.

At step 212, the system initiates playback of the media content on the broadcasting device. In some embodiments, initiating playback of the media content on the broadcasting device includes sending a signal which instructs the broadcasting device to begin playback of the content on its respective streaming service. In other embodiments, initiating playback of the media content on the broadcasting device includes the system streaming the content directly to the broadcasting device. In some embodiments, initiating of playback occurs upon the system receiving an acceptance to the request message from the broadcasting device. In other embodiments, a request message need not be sent in order for initiation of playback on the broadcasting device to begin, and/or an acceptance to a request message need not be received in order for initiation of playback to begin. Any other suitable triggering event, or no event, may be contemplated to occur in order for initiation of playback to begin.

In some embodiments, there is no storage of media content files or processing of media content with respect to playback being performed on the broadcasting device. Instead, a location on a media server is transmitted, representing the location of the selected media content on that media server. The media server handles the processing of the media content based on the media content being stored there or, in some embodiments, within a media content repository in a database (such as a cloud-based repository).

In some embodiments, one or more applications or software components can be installed on the broadcasting device which can serve as "message receiver" component(s). Rather than, e.g., directly opening media content located on the media server, the system instead sends a request directly to the message receiver components installed on the broadcasting device. The message receiver continuously receives the request and then determines, externally to the system, how to begin playback of the media content. Such message receiver components can initiate playback on the broadcasting device via potentially any suitable method in which software components can instruct a device to carry out media playback operations, either in concert with other applications on the device or on their own.

In some embodiments, as the media content is being played back on the broadcasting device(s) of choice, the user interface the user had been using can transform (automatically or with a user selection) into a "virtual remote", i.e., an approximation of a traditional TV remote as used with respect to TV sets. The virtual remote allows the user to make one or more selections or interact with a layout of user interface buttons designed to mimic a traditional TV remote. Upon the user selecting or interacting with a component, results appear on the content broadcast in real-time or substantially real-time, e.g., with minimal or no noticeable lag between a button press and a result on screen. For example, the user can adjust playback controls for the media such as start, stop, pause, rewind, fast forward, play back at a designated playback speed (e.g., 0.5×, 0.75×, 1.5×, etc.), or any of a number of suitable playback controls. The user may be able to, e.g., select for the display of subtitles or closed captioning and select which language the subtitles or closed captioning should appear in; adjust volume levels; or any other media control which may be contemplated.

In some embodiments, the virtual remote may also serve as a "guide" analogous to a traditional television guide, i.e., a form of browsing or navigating through other available media content while the present piece of media content is playing. Thus, the browsing of content and playback of content occur concurrently. In some embodiments, an option may be present to pause the playback of content during browsing of other content.

Figure 2B:
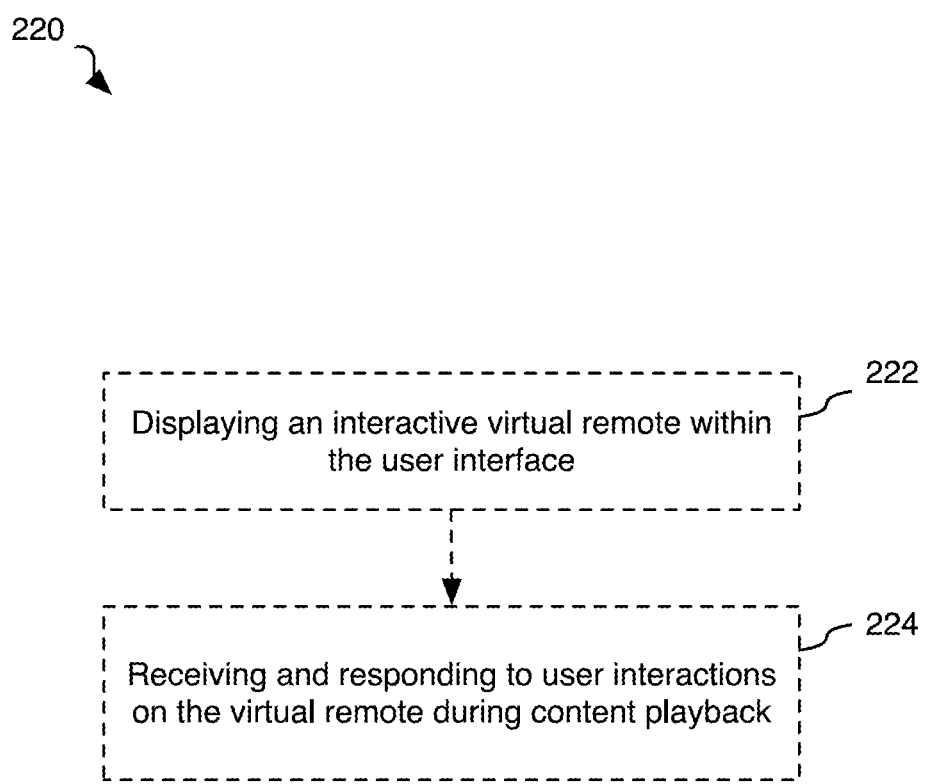
FIG. 2B is a flow chart illustrating additional steps that may be performed in accordance with some embodiments.

FIG. 2B is a flow chart illustrating additional optional steps that may be performed in accordance with some embodiments. Specifically, FIG. 2B describes steps which occur during playback of the media content, related to the usage of a virtual remote by the user. At optional step 222, the system displays an interactive virtual remote within the user interface, as described above. At optional step 224, the system receives and responds to user interactions on the virtual remote during content playback, as described above.

FIGS. 3A, 3B, 3C, and 3D illustrates aspects of the user interface described above, as well as aspects of the user's experience in navigating through media content, selecting media content and broadcasting device(s), and using a virtual remote control during playback of the media content.

Figure 3A:
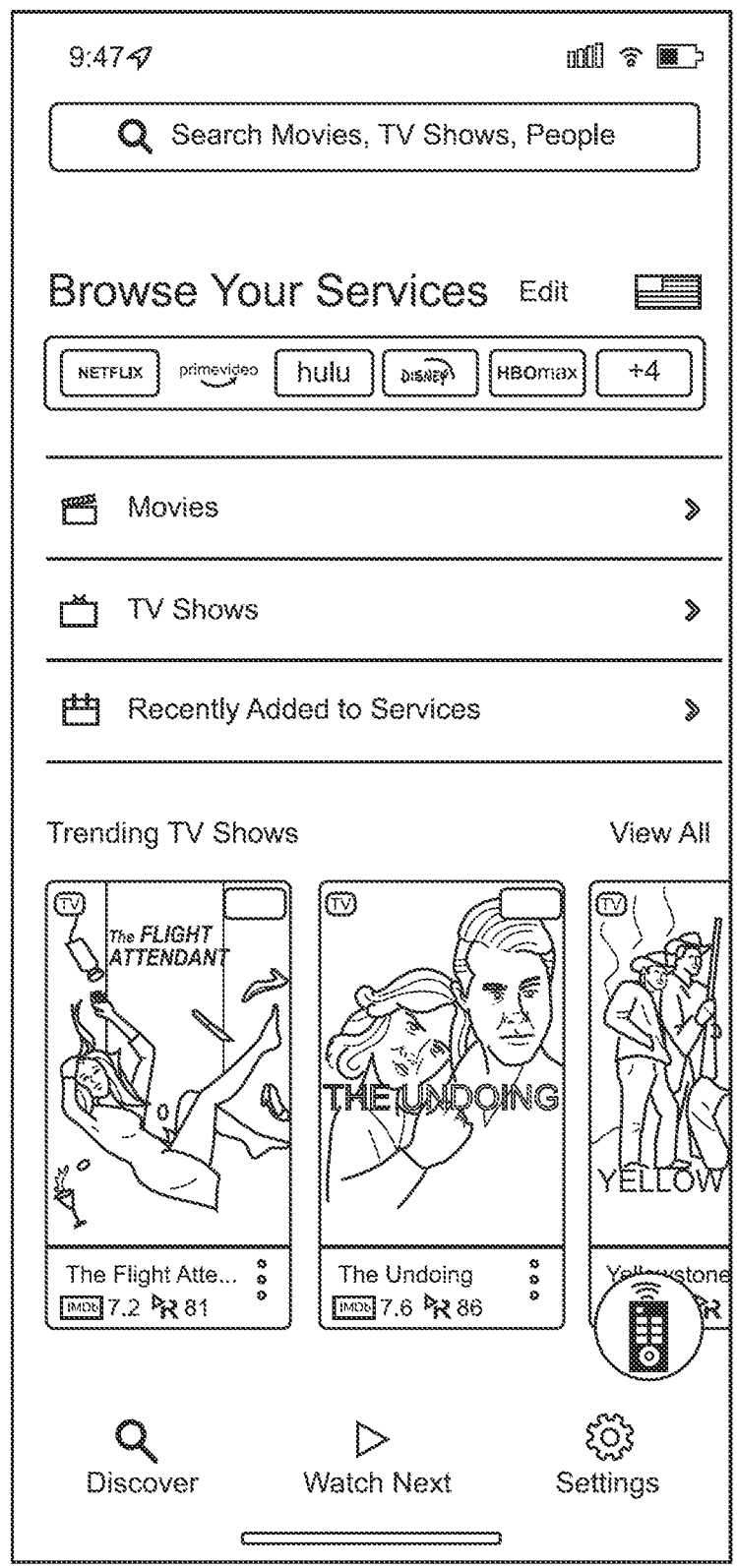
FIG. 3A is a diagram illustrating one example embodiment of a user navigating an aggregated streaming media application, in accordance with some embodiments.

FIG. 3A is a diagram illustrating one example embodiment 300 of a user navigating an aggregated streaming media application, in accordance with some embodiments. The user interface provides an ability to search, e.g., "Search Movies, TV Shows, People", and the user can also browse the user-selected services for particular service providers. In some embodiments, rather than selecting content based on particular service providers, the user sees all of the disparate media content from different service providers within one single, unified format. In some embodiments, the images and other metadata are formatted to be unified within the application and user interface. In some embodiments, suggestions or trending media content is provided to the user, such as "Trending TV Shows" as shown.

Figure 3B:
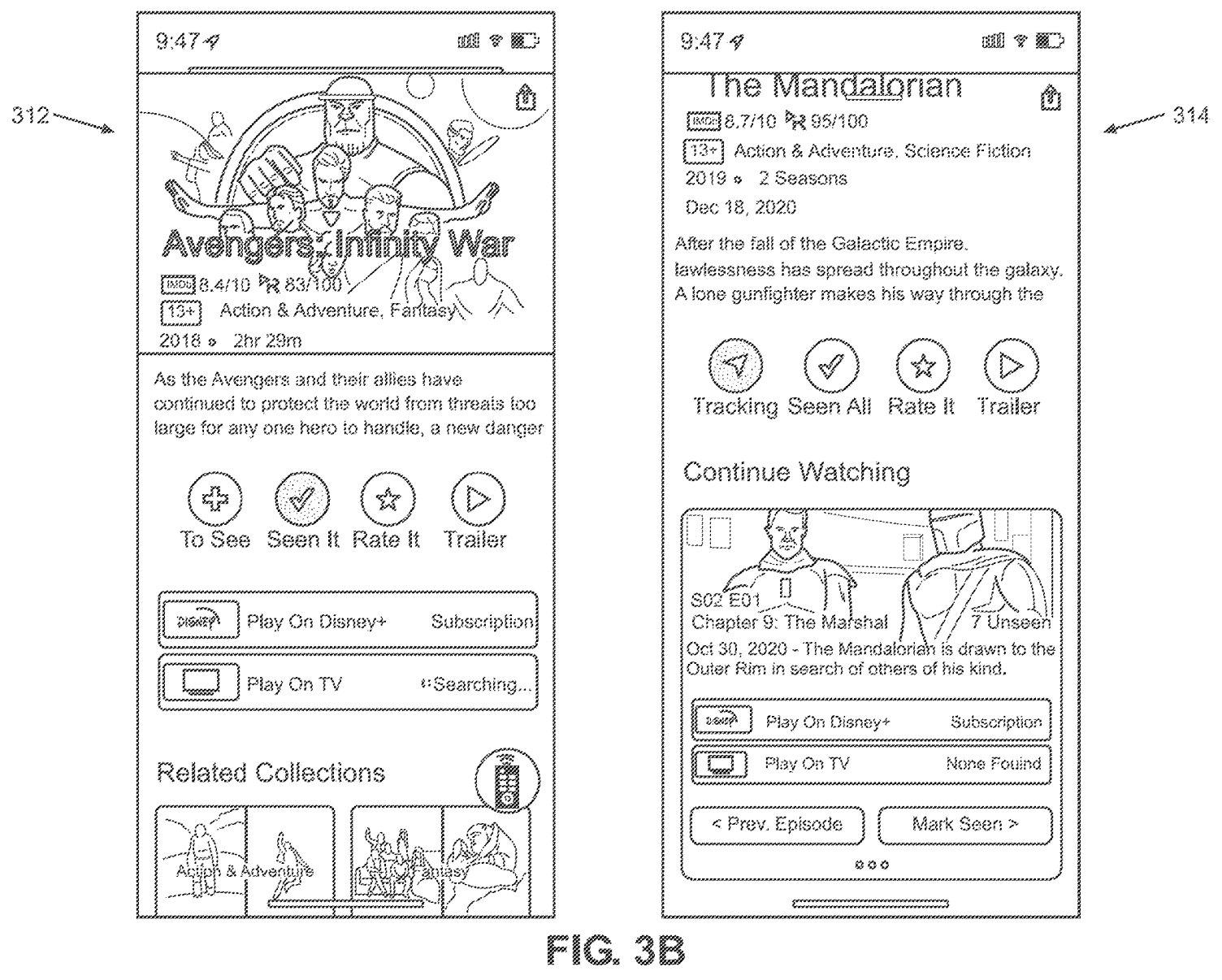

FIG. 3B is an additional diagram illustrating two example embodiments 312 and 314 of a user navigating an aggregated streaming media application, in accordance with some embodiments. As shown in example embodiment 312, upon a user selecting one of the pieces of media content during navigation, a sub screen appears with additional information about that piece of media content in particular. In the illustrated sub screen, the user sees additional details. In some embodiments, the additional details can be parsed from additional content metadata received from the service provider, while in other embodiments, some additional details can be parsed from one or more other sources (e.g., one or more external data sources). A title, year of release, genres, aggregated rankings from different film ranking websites, duration of the movie, and content rating are displayed. The user may also add the content to a wish list or queue, or designate the movie as already viewed. A list of streaming services which host the media content is displayed. In this case, the media content is available on Disney+ for users with subscriptions. The user can select which of the services he or she would like to use for playback of the content. A message, "Play On TV", also indicates that the user may be able to watch on a broadcasting device which is connected and available, such as a television. In some embodiments, the system is constantly or periodically determining available, connected devices, so that when a selection is made, the user can quickly see which devices are available. The "Searching . . . " message next to "Play On TV" illustrates that the system is still in the process of determining the availability of connected devices. Example embodiment 314 illustrates similar components to example embodiment 312, albeit for a television series rather than for a film.

Figure 3C:
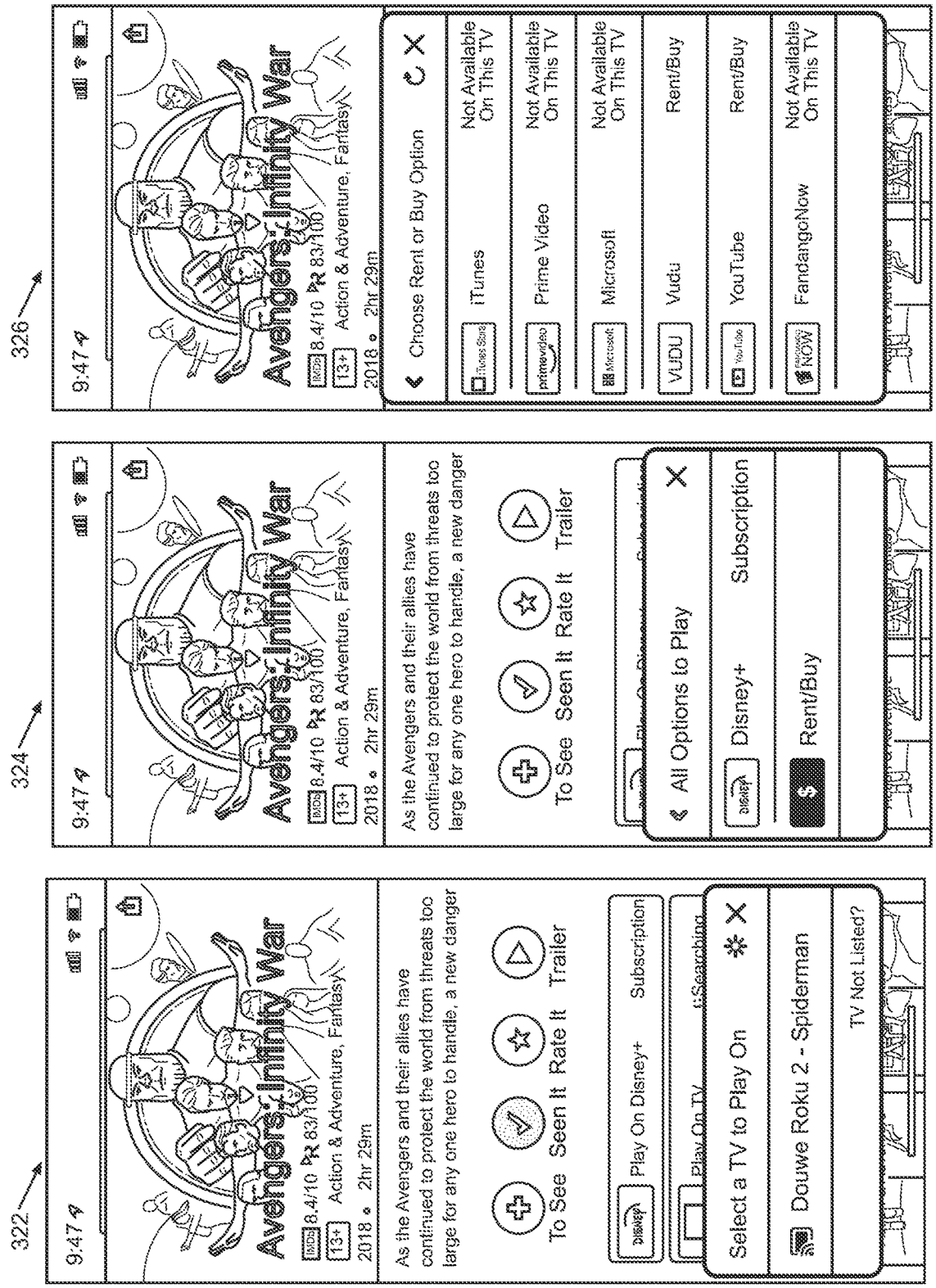
FIG. 3C is an additional diagram illustrating three example embodiments of a user navigating an aggregated streaming media application, in accordance with some embodiments.

FIG. 3C is an additional diagram illustrating example embodiments 322, 324, and 326 of a user navigating an aggregated streaming media application, in accordance with some embodiments. As shown in example embodiment 322, the user interface prompts the user to select which broadcasting device to play back the content on, from among a list of available, connected devices. The user in the illustration can select between "Douwe Roku 2—Spiderman" as an available broadcasting device. In example embodiment 324, the user can select a method for viewing the content, among the options of a subscription streaming service ("Disney+") or rental/purchase. In example 326, the user has selected the rental/purchase option, and is presented with further choices within a submenu. Some of the options are unavailable on this particular broadcasting device (e.g., iTunes, Prime Video, etc.), i.e., the application does not exist on the selected broadcasting device's platform and is unavailable for installation. The user thus has the options of Vudu or Youtube to rent and/or purchase the content. In some embodiments, if a particular application is not already installed on the broadcasting device but is offered on the broadcasting device's platform, the system will initiate an attempt to automatically install the application on the broadcasting device. In other embodiments, the system will prompt the user to install the application.

Figure 3D:
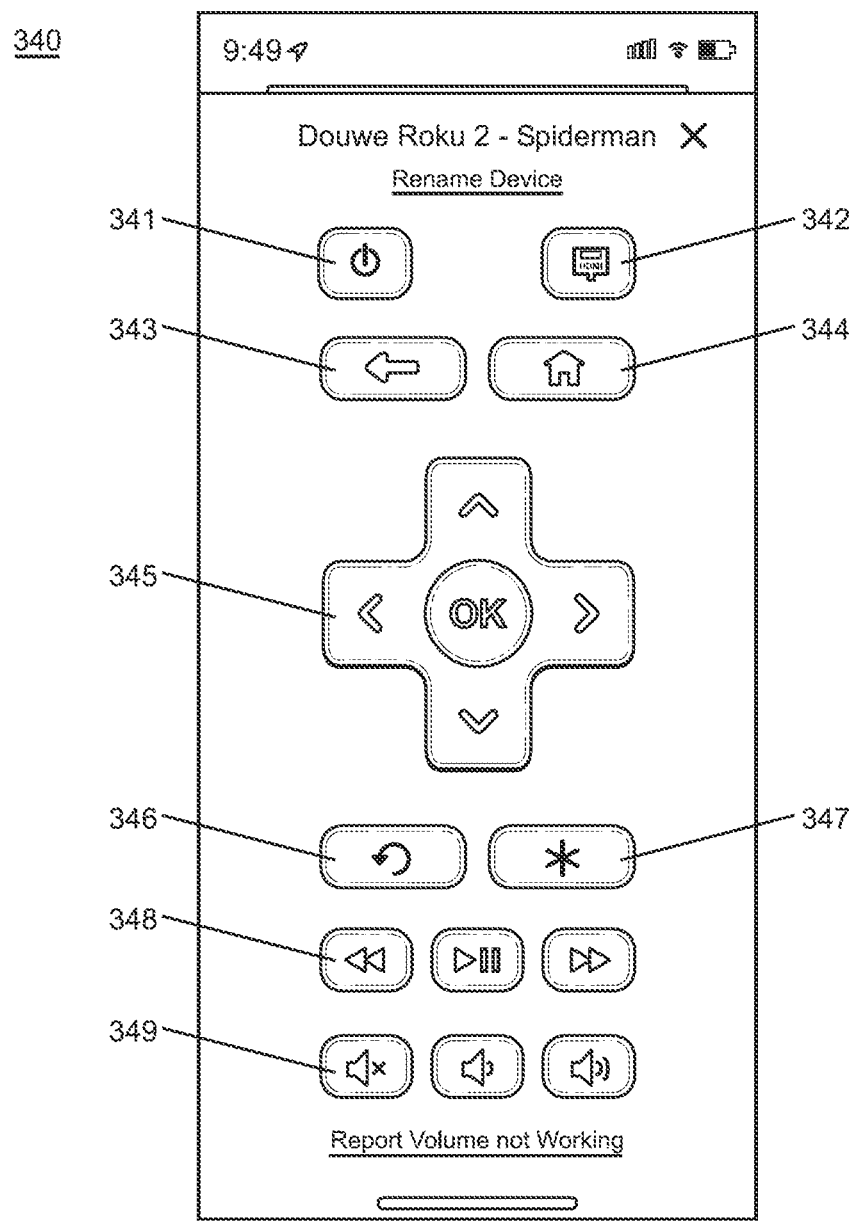
FIG. 3D is an additional diagram illustrating one example embodiment of a user navigating an aggregated streaming media application, in accordance with some embodiments.

FIG. 3D is an additional diagram illustrating one example embodiment 340 of a user navigating an aggregated streaming media application, in accordance with some embodiments. Upon the media content being played on the broadcast device, the user interface can automatically or manually switch to a "virtual remote" interface, as illustrated. The virtual remote allows the user to interact with remote buttons, as on a traditional TV remote. Example buttons illustrated include, from top to bottom and left to right: a power and/or suspend/sleep button 341; an input signal button 342, which is configured to switch the video signal on the television the user is connected to (e.g., switching between HDMI Input 1 and HDMI Input 2); a back button 343; a home button 344; a directional pad for navigation with confirmation button 345; an "instant replay" button 346, which is configured to automatically rewind the media stream the user is currently watching by an increment of time (e.g., 10 seconds); a "more options" button 347, which is configured to display a popup menu which a user can navigate to perform secondary actions (e.g., removing an installed app from the device the user is connected to); playback controls 348, including a rewind button, play or pause button, and fast forward button; and audio controls 349, including a disable audio button, decrease volume button, and increase volume button. Upon interacting with the buttons, a corresponding result occurs at the broadcasting device where the content is being played.

Figure 4A:
FIG. 4A is a diagram illustrating one example embodiment of a user receiving a notification of available media content, in accordance with some embodiments.

FIG. 4A is a diagram illustrating one example embodiment 300 of a user receiving a notification of available media content, in accordance with some embodiments. In some embodiments, the user may choose, via an opt-in or opt-out setting, to receive notifications when new pieces of media content become available for streaming on one or more of the streaming services the user is connected to. In some embodiments, the user can configure a wish list or queue of media content titles which the user wishes to be notified about. In some embodiments, the system recommends one or more titles for notification. In some embodiments, notifications can be customized in various ways, as is common among push notifications and other forms of notifications within mobile devices and other client devices.

Figure 4B:
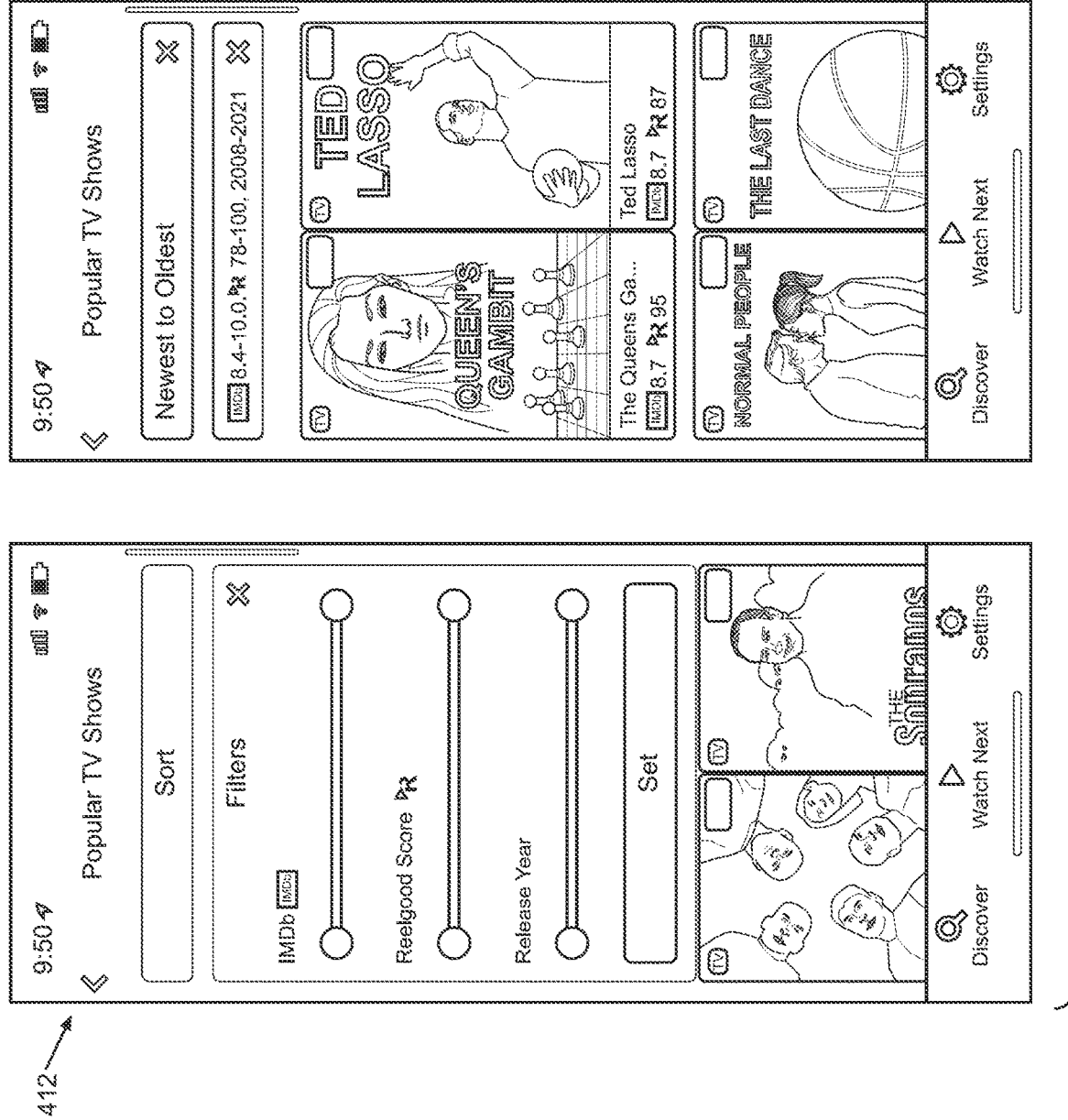
FIG. 4B is a diagram illustrating two example embodiments of a user filtering media content within an aggregated streaming media application, in accordance with some embodiments.

FIG. 4B is a diagram illustrating two example embodiments 412 and 414 of a user filtering media content within an aggregated streaming media application, in accordance with some embodiments. A user may choose to receive recommendations of media content which are to appear in the user interface, such as at a landing page or dashboard upon first starting the application or logging in. In some embodiments, recommendations may be customized for each user. Recommendations can be sorted by various criteria. As illustrated in example embodiment 412, recommendations can be filtered according to one or more factors, including, e.g., IMDB rating, a score internal to the application, release year range, and more. In some embodiments, recommendations can be curated on behalf of a user based on various pieces of user data, such as, e.g., the user's history of past media content selections. In example embodiment 414, a user has chosen to sort recommendations for television shows by newest to oldest release date, and has chosen to filter television shows based on: an IMDB rating between 8.4 and 10, an internal application score between 78 and 100, and release year between 2008-2021. A selection of television shows falling within the parameters of these filters is presented to the user, sorted in order of newest to oldest release date of the content.

Figure 5:
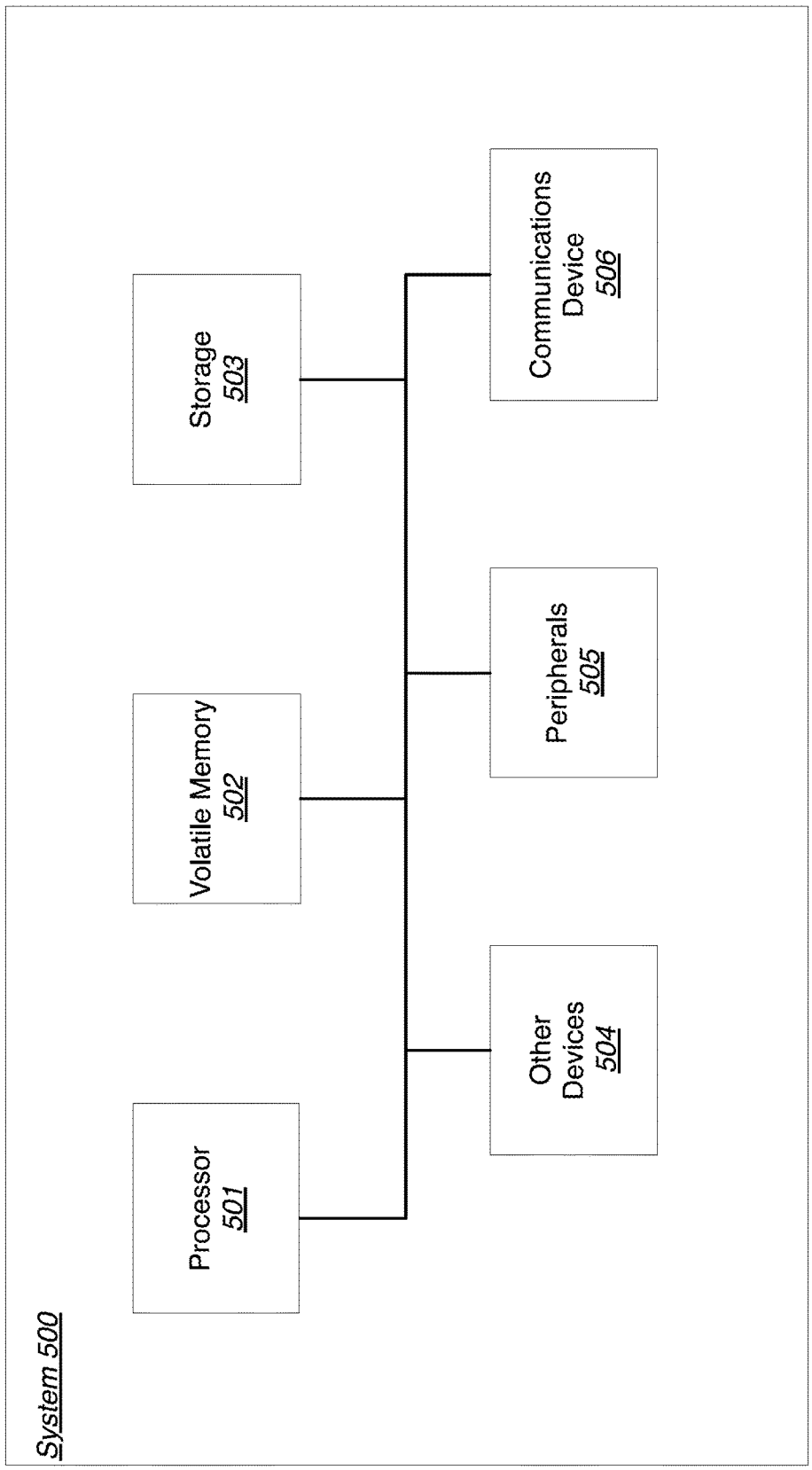
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing aggregated media content selection and broadcasting, the method comprising:
   displaying, via a client device, a listing of a multiple service providers;
   receiving a selection of a plurality of the multiple service providers from the displayed listing;
   receiving media content and associated content metadata associated with the selected plurality of service providers;
   configuring, based at least on the media content and associated content metadata, a user interface for display on a client device, wherein the user navigates and selects from at least an aggregated subset of the media content, wherein the aggregated subset comprises media content aggregated across the plurality of service providers;
   receiving, via the client device, a media content selection for one of the multiple aggregated subset of the media content;
   determining a list, of one or more broadcasting devices currently available for broadcasting of media content, wherein the one or more broadcasting devices has an installed media content application used for playing the media content for a particular service provider, and wherein at least one of the one or more broadcasting devices being a different device than the client device, and wherein the one or more broadcasting devices are also connected to the same network which the client device is connected to;
   displaying, via the client device, a user interface including a user interface section to receive a selection to play the selected media content via one of the one or more broadcasting devices from the determined list of one or more broadcasting devices, the user interface including a portion displaying multiple separate graphical representations of the subset of the media content for different service providers, the separate graphical representations each including an image representing an individual media content and a graphical identifier of the respective service provider which is displayed over a portion of the image;
   in response to receiving a selection to play the media content via one of the one or more broadcasting devices, then:
      initiating playback of the selected media content on the selected broadcasting device via the installed media content application of the selected broadcasting device.

2. The method of claim 1, further comprising:
   upon initiating playback of the selected media content on the selected broadcasting device, displaying, within the user interface for the user, an interactive virtual remote with at least media content playback controls, wherein a name indicating the selected broadcasting device is displayed along with the at least media content playback controls.

3. The method of claim 2, wherein the interactive virtual remote further comprises one or more components for navigating and selecting from the subset of the media content concurrently to playback of the media content on the broadcasting device.

4. The method of claim 1, wherein the subset of the media content does not include one or more user selections of media content to be removed from the user interface.

5. The method of claim 1, further comprising:
   displaying, via the client device, a user interface comprising a plurality of graphical controls for selecting a range of values for one or more media content filters, the graphical controls including a control for selecting a range of an IMDB rating and a control for selecting a range of a release year; and wherein the subset of the media content is determined based on the one or more media content filters configured by the user, and displayed media content includes a IMDB value.

6. The method of claim 1, wherein the subset of the media content comprises one or more recommendations of media content based on previously received media content selections associated with the user.

7. The method of claim 1, wherein receiving the service providers comprises receiving a set of one or more service providers selected by a user.

8. The method of claim 1, wherein determining the list of one or more devices available for broadcasting of media content comprises:

determining a list of connected broadcasting devices; and determining, from the list of connected broadcasting devices, a subset of broadcasting devices configured for playing the media content via the installed media content application.

9. The method of claim 8, further comprising:

determining, from the list of connected broadcasting devices, a subset of broadcasting devices which are not configured for playing the media content via an installed media content application, verifying, for each of the broadcasting devices in the subset, that the media content application can be installed on the broadcasting device, and automatically installing the media content application on each verified broadcasting device.

10. The method of claim 1, further comprising:

sending, to the selected broadcasting device, associated content metadata for the media content selection which uniquely identifies the selected media content.

11. The method of claim 1, wherein the associated content metadata includes unique content identification data, wherein the unique content identification data is used for identification and playback of the media content from one or more media servers associated with the respective service provider for the media content.

12. The method of claim 1, wherein receiving media content and associated content metadata associated with the plurality of service providers comprises:

prior to configuring the user interface:

receiving first media content and associated first content metadata offered by a first service provider;

receiving second media content and associated second content metadata offered by a second service provider;

identifying, based on the first content metadata, a first location from which to request playback of the first media content; and identifying, based on the second content metadata, a second location from which to request playback of the second media content, the first and the second locations situated remotely from each other.

13. The method of claim 1, further comprising: initiating display of the list of currently available broadcasting devices prior to playback of any portion of media content that corresponds to the media content selection.

14. The method of claim 1, further comprising:

in addition to displaying the one or more broadcasting devices, displaying, via the client device, a user interface section for the selection of the client device as a broadcasting device.

15. The method of claim 1, wherein initiating playback comprises:

opening a web socket between the client device and the selected broadcasting device; and sending a message from the client device, via the web socket, to the selected broadcasting device to begin playback of the selected media content.

16. The method of claim 1, further comprising:

prompting, via the user interface, a user to select from among a list of available connected devices, a broadcasting device to play back the content, wherein the user interface displays a list of multiple broadcasting devices proximate to an image representing the media content;

in response to receiving a selection of the broadcasting device, displaying via the user interface, options to play the media content, the options comprising renting or buying the media content; and displaying, via the user interface, a listing of service providers where the media content may be rented or bought.

17. The method of claim 16, wherein the listing displays an indication if the media content is not available on the broadcasting device.

18. A non-transitory computer-readable medium containing instructions for providing aggregated media content selection and broadcasting, the method comprising:

instructions for displaying, via a client device, a listing of a multiple service providers;

instructions for receiving a selection of a plurality of the multiple service providers from the displayed listing;

instructions for receiving media content and associated content metadata associated with the selected plurality of service;

instructions for configuring, based at least on the media content and associated content metadata, a user interface for display on a client device, wherein the user navigates and selects from at least an aggregated subset of the media content, wherein the aggregated subset comprises media content aggregated across the plurality of service providers;

instructions for receiving, via the client device, a media content selection for one of the multiple aggregated subset of the media content;

instructions for determining a list, of one or more broadcasting devices currently available for broadcasting of media content, wherein the one or more broadcasting devices has an installed media content application used for playing the media content for a particular service provider, the one or more broadcasting devices being a different device than the client device, and wherein at least one of the one or more broadcasting devices are also connected to the same network which the client device is connected to;

instructions for displaying, via the client device, a user interface including a user interface section to receive a selection to play the selected media content via one of the one or more broadcasting devices from the determined list of one or more broadcasting devices, the user interface including a portion displaying separate graphical representations of the multiple available media content from multiple service providers, the separate graphical representations including an image of the respective available media content and a graphical identifier of the respective service provide which is displayed over a portion of the graphical representation;

in response to receiving a selection to play the media content via one of the one or more broadcasting devices, then:

instructions for initiating playback of the selected media content on the selected broadcasting device via the installed media content application of the selected broadcasting device.

19. The system of claim 18, further comprising:
instructions for, upon playing the selected media content on the selected broadcasting device, displaying, within the user interface for the user, an interactive virtual remote with at least media content playback controls, wherein a name indicating the selected broadcasting device is displayed along with the at least media content playback controls.

20. The system of claim 19, wherein the interactive virtual remote further comprises one or more components for navigating and selecting from the subset of the media content concurrently to playing the media content on the broadcasting device.

21. The system of claim 18, wherein the subset of the media content comprises one or more recommendations of media content based on previously received media content selections associated with the user.

22. The system of claim 18, wherein receiving the service providers comprises receiving a set of one or more service providers selected by a user.

23. The system of claim 18, wherein instructions for determining the list of one or more devices available for broadcasting of media content comprises:

instructions for determining a list of connected broadcasting devices, and instructions for determining, from the list of connected broadcasting devices, a subset of broadcasting devices configured for playing the media content via an installed media content application.

24. The system of claim 23, further comprising:
instructions for determining, from the list of connected broadcasting devices, a subset of broadcasting devices which are not configured for playing the media content via an installed media content application, instructions for verifying, for each of the broadcasting devices in the subset, that the media content application can be installed on the broadcasting device, and instructions for automatically installing the media content application on each verified broadcasting device.

25. The system of claim 18, further comprising:
instructions for in addition to displaying the one or more broadcasting devices, displaying, via the client device, a user interface section for the selection of the client device as a broadcasting device.

26. The system of claim 18, wherein initiating playback comprises:

instructions for opening a web socket between the client device and the selected broadcasting device; and instructions for sending a message from the client device, via the web socket, to the selected broadcasting device to begin playback of the selected media content.

\* \* \* \* \*